UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ANTHRACENE DYE.

No. 874,744.

Specification of Letters Patent.

Patented Dec. 24, 1907.

Application filed August 15, 1907. Serial No. 388,694.

*To all whom it may concern:*

Be it known that I, JOSEPH DEINET, a citizen of the German Empire, residing at Elberfeld, Kingdom of Prussia, Germany, have invented new and useful Improvements in Anthracene Dyestuff, of which the following is a specification.

My present invention relates to the production of a new dyestuff of the anthracene series from which a vat can be prepared and which dyes unmordanted cotton olive-green shades from such a vat. The process for its production consists in treating a solution of alpha-methylaminoanthraquinone in sulfuric acid with metals, *e. g.* aluminum, copper, silver, or the like.

In carrying out my process practically I can proceed as follows, the parts being by weight: 20 parts of alpha-methylaminoanthraquinone are dissolved in 400 parts of sulfuric acid (66° Bé.) heated to 25–30° centigrade, and 5 parts of aluminum bronze are then slowly added to the mixture which is heated to 90–100° centigrade for half an hour. The melt is stirred into 5–6000 parts of water, the precipitate is filtered off and washed until it is neutral.

My new dyestuff is a dark greenish-black paste scarcely soluble in organic solvents. It dissolves in concentrated sulfuric acid with a dull violet color. Upon treatment with an alkaline solution of hydrosulfite of sodium, it yields a reddish vat which dyes unmordanted cotton fast olive-green shades.

Having now described my invention and in what manner the same is to be performed, what I claim as new, and desire to secure by Letters Patent, is:—

The herein-described new dyestuff which can be obtained by treating a sulfuric acid solution of alpha - methylaminoanthraquinone with aluminum, which dyestuff is a dark greenish-black paste soluble in concentrated sulfuric acid with a dull violet color; and giving a reddish vat with hydrosulfite and caustic soda lye, which vat dyes unmordanted cotton olive-green shades, substantially as hereinbefore described.

In testimony whereof I have hereunto set my hand in the presence of two subscribing witnesses.

JOSEPH DEINET. [L. S.]

Witnesses:
 OTTO KÖNIG,
 WALTER GREEFF.